United States Patent
Flockhart et al.

(10) Patent No.: US 9,781,263 B2
(45) Date of Patent: Oct. 3, 2017

(54) CONTEXT-BASED DYNAMIC ADJUSTMENT TO PACING ALGORITHM

(75) Inventors: Andrew D. Flockhart, Thornton, CO (US); Joylee Kohler, Northglenn, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 394 days.

(21) Appl. No.: 13/403,628

(22) Filed: Feb. 23, 2012

(65) Prior Publication Data

US 2013/0223608 A1    Aug. 29, 2013

(51) Int. Cl.
*H04M 3/00* (2006.01)
*H04M 3/51* (2006.01)
*H04M 3/523* (2006.01)

(52) U.S. Cl.
CPC ........ *H04M 3/5158* (2013.01); *H04M 3/5233* (2013.01)

(58) Field of Classification Search
CPC .. H04M 3/5158; H04M 3/523; H04M 3/5232; H04M 3/5238; H04M 3/5233; H04M 3/5175; H04M 3/51; H04M 3/5191; H04M 3/5183
USPC .............. 379/265.01–265.02, 265.1, 265.05, 379/266.07
See application file for complete search history.

(56) References Cited

U.S. PATENT DOCUMENTS

| | | | | |
|---|---|---|---|---|
| 4,881,261 | A * | 11/1989 | Oliphant | H04M 3/5158 379/215.01 |
| 5,214,688 | A * | 5/1993 | Szlam et al. | 379/266.08 |
| 5,247,569 | A * | 9/1993 | Cave | H04M 3/36 379/112.01 |
| 7,035,927 | B2 | 4/2006 | Flockhart et al. | |
| 2004/0170258 | A1* | 9/2004 | Levin et al. | 379/88.01 |
| 2007/0127690 | A1* | 6/2007 | Patakula et al. | 379/265.05 |
| 2010/0235218 | A1 | 9/2010 | Erhart et al. | |
| 2010/0296417 | A1 | 11/2010 | Steiner | |
| 2011/0125793 | A1 | 5/2011 | Erhart et al. | |
| 2011/0125826 | A1 | 5/2011 | Erhart et al. | |
| 2011/0150208 | A1* | 6/2011 | Stearns | 379/266.07 |
| 2011/0255683 | A1 | 10/2011 | Flockhart et al. | |

\* cited by examiner

*Primary Examiner* — Rasha Al Aubaidi
(74) *Attorney, Agent, or Firm* — Sheridan Ross P.C.

(57) ABSTRACT

A contact center is described along with various methods and mechanisms for administering the same. The contact center proposed herein provides the ability to, among other things, assess contextual information and adjust an outbound dialer's pacing algorithm based on the assessment thereof. The contextual information may be obtained from sources that are inside the contact center and outside the contact center.

20 Claims, 4 Drawing Sheets

CONTEXT-BASED DYNAMIC ADJUSTMENT TO PACING ALGORITHM

FIELD OF THE DISCLOSURE

The present disclosure is generally directed toward communications and more specifically toward contact centers.

BACKGROUND

In traditional contact centers, all agents in an outbound calling campaign are generally considered the same and will be delivered the next outbound call attempt which is successfully answered by a customer in the order that the agents becomes available. In more sophisticated contact centers, the agents may be ranked for outbound calls by skill level and/or idle time. This approach, however, does not optimize the matching of the skills and abilities of the agent with the unique needs of the person being called and, therefore, only achieves average results.

Meanwhile, outbound dialers are currently optimized to minimize idle time and outbound dialers are paced in order to attempt to perfectly synchronize the answering of outbound call attempts with the availability of agents to service those calls. Additional details of a contact center employing such a pacing function is described in U.S. Pat. No. 7,035,927 to Flockhart et al., the entire contents of which are hereby incorporated herein by reference.

SUMMARY

It is, therefore, one aspect of the present disclosure to provide an outbound dialer that can have its pacing algorithm (e.g., pacing function or pacer) controlled in a more flexible and valuable manner. Specifically, the present disclosure proposes the ability to consider contextual information as an input for adjusting an outbound dialer's pacing algorithm.

In some embodiments, a predictive tool is provided which analyzes various types of contextual information and based on that analysis determines whether to adjust the pacing algorithm (e.g., speed up the rate at which outbound calls are made or slow down the rate at which outbound calls are made). In some embodiments, contextual information can be obtained from within the contact center and/or from outside the contact center.

As one non-limiting example, the characteristics of recent successful or unsuccessful outbound calls (e.g., outbound calls made within a previous and predetermined amount of time) can be analyzed. The analysis of the recent successful or unsuccessful outbound calls can be leveraged to predict the next best outbound call to make. One characteristic that may be analyzed is "hit rate" or the ratio of successful connections made between a customer and agent to the total number of outbound call attempts. As one example, if hit rates are detected to have an increase in a certain geographical region, then it can be predicted that more contacts in the same geographical region will also be successful, perhaps for a predetermined amount of time.

Continuing the above example, it may also be possible to enable the predictive tool to analyze information about the geographical region (e.g., weather, current time of time in the region, news for the region, known events in the region, etc.) and use that information to adjust outbound dialing rates for outbound call attempts to that region. The information about the geographical region may be obtained from various sources which are internal and/or external to the contact center (e.g., news sources, RSS feeds, social media feeds, etc.).

In some embodiments, the predictive tool is configured to analyze commonalities for successful outbound contacts and look for patterns of success. It may not even be necessary for the predictive tool to understand why outbound contacts of a certain type are being successful at a certain time. Rather, if the predictive tool observes a spike in success for outbound contacts of a certain type, then the predictive tool can select more outbound contacts from a campaign list that have similarities to the latest set of successful outbound contacts. The predictive tool does not necessarily need to understand why success is being obtained, but the predictive tool may try to increase outbound dialing rates for contacts that are similar in nature to recently-successful ones.

Alternatively, or in addition, the predictive tool may select more contacts that are similar to recently-successful contacts for dialing from the campaign list without actually increasing outbound dialing rates. Once the abnormality in success decreases for that type of contact, then the predictive tool may re-adjust the dialing rate or set the contact selection back to a more even or random distribution.

In some embodiments, the predictive tool may be configured to analyze other sources of information and control the outbound dialer's pacing algorithm based on such an analysis. In particular, the present disclosure proposes to use one or both of Weighted Advance Time (WAT) and well-matched criteria to adjust the pacing algorithm. Specifically, pacing adjustments can be made based on well-matched (e.g., has appropriate skill or skill level, speaks language natively, is primary role) and/or WAT.

In a non-limiting example, a best call to place next can be chosen based on well-matched and WAT inputs. When considering well-matched criteria, if there is one or no agents that have a well-matched skill set for a set of possible outbound calls (e.g., all calls in the campaign list or the next X possible calls in the campaign list), then the pacing algorithm may be slowed down. Slowing down the pacing algorithm in this situation may be beneficial because if a predetermined number of outbound calls are connected with agents, then it is likely that those connected calls will take longer than an average handle time to be completed (e.g., because the agents currently available to handle such calls are not well-matched to the calls). However, if there are a large number of agents that are well-matched to handle the calls in the set of possible outbound calls, then the pacing algorithm may be sped up. Speeding up the pacing algorithm in this situation may be beneficial because if the same predetermined number of outbound calls are connected with agents, there is a higher probability that the calls will be handled in less than an average amount of time.

When considering WAT, if the WAT is relatively high (e.g., slow moving) for a skill, then outbound dialing rates for that skill may be decreased. Conversely, if WAT is relatively low (e.g., fast moving) for a skill, then outbound dialing rates may be increased for that skill.

Both well-matched and WAT criteria may be considered simultaneously as inputs for adjusting the outbound dialing rate. In some embodiments, various combinations of contextual information, well-matched information, and WAT information can be used to control the outbound dialer's pacing algorithm. Hit rates may also be used to adjust the pacing (track immediate hit-rate to slow down or speed up pacing).

Embodiments of the present disclosure are not limited to calls, but can be employed for any contact type (e.g., email, text, IM chat, call, video call, etc.), whether inbound or outbound.

In accordance with at least some embodiments of the present disclosure, a method of controlling an outbound dialer in a contact center is provided which generally comprises:

analyzing at a first time at least one of (i) characteristics of successful outbound contacts that have occurred within a predetermined amount of time prior to the first time, (ii) well-matched criteria between a subset of agents in the contact center and potential outbound calls in a campaign list, and (iii) Weighted Advance Time (WAT) for one or more skills in the contact center; and based on the analysis step, adjusting the outbound dialer's pacing algorithm.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
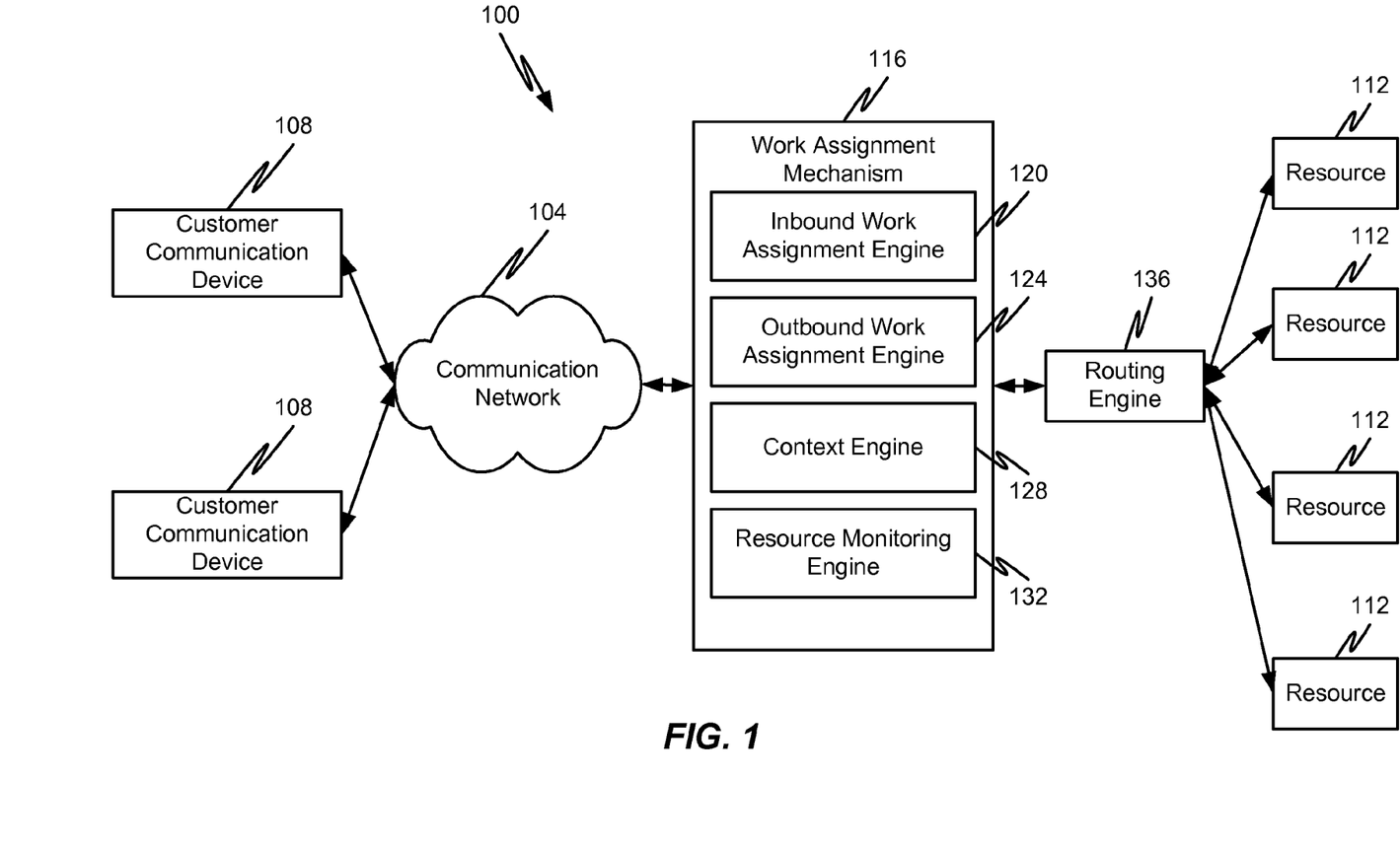
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises one or more communication networks 104. In some embodiments, the communication network 104 connects one or more customer communication devices 108 to a work assignment mechanism 116, which may be owned and operated by an enterprise administering a contact center in which a plurality of resources 112 are distributed.

The resources 112 may be capable of handling incoming work items (in the form of contacts) from the customer communication devices 108. Incoming work items are typically originated outside of the contact center, for example, by a customer operating the customer communication device 108. The resources 112 may also be capable of handling outgoing work items (also in the form of contacts). Outgoing work items, also referred to herein as outbound work items, are typically originated from within the contact center. One example of an outbound work item is a call placed by the contact center to a customer communication device 108. Some resources 112 may be only capable of handling one type of work item (e.g., either inbound or outbound) whereas other resources may be capable of handling both types of work items, sometimes simultaneously (e.g., an inbound non-real-time work item such as an email and an outbound real-time work item such as a call).

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different physical signal carriers such as coaxial cable, copper cable/wire, fiber-optic cable, antennas for transmitting/receiving wireless messages, and combinations thereof.

The communication devices 108 may correspond to customer communication devices. In some embodiments, the communication devices may be configured to process work items in the form of a telephone call, a packet or collection of packets (e.g., IP packets transmitted over an IP network), an email message, an Instant Message, an SMS message, a fax, and combinations thereof. Outbound work items, in particular, may be similar or identical in nature to traditional inbound work items except that they are originated by the contact center rather than the customer.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 136 to connect the communication device 108 which initiated (for inbound work items) or was the target of (for outbound work items) the communication with the assigned resource 112.

Although the routing engine 136 is depicted as being separate from the work assignment mechanism 116, the routing engine 136 may be incorporated into the work assignment mechanism 116 or its functionality may be executed by the various work assignment engines 120 and/or 124.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112, 148. The type of medium used by the communication device 108 to communicate with other communication devices 108 or processing resources 112, 148 may depend upon the communication applications available on the communication device 108.

In accordance with at least some embodiments of the present disclosure, the work item is sent toward a collection of processing resources 112 via the combined efforts of the work assignment mechanism 116 and routing engine 136. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

In some embodiments, the work assignment mechanism 116 comprises an inbound work assignment engine 120 which enables the work assignment mechanism 116 to make intelligent routing decisions for work items originated by customers. The work assignment mechanism 116 may also comprise an outbound work assignment engine 124 which enables the work assignment mechanism 116 to originate contacts and when a customer answers the attempted contact to assign the outbound contact to a resource 112 as an outbound work item.

Although the inbound work assignment engine 120 is depicted as being separate and distinct from the outbound work assignment engine 124, it should be appreciated that the functionality of both engines can be integrated into a single work assignment engine. It should also be appreciated that certain capabilities discussed herein with respect to one work assignment engine can be incorporated into the other work assignment engine without departing from the scope of the present disclosure.

In some embodiments, the work assignment engines 120, 124 are configured to administer and make work assignment decisions in a queueless contact center, as is described in U.S. patent application Ser. No. 12/882,950, the entire contents of which are hereby incorporated herein by reference. The work assignment engines 120, 124 may also be configured to administer and make work assignment decisions in a traditional queue-based contact center where skill-based routing is used to assign work items to resources 112.

If a queueless contact center is implemented, the work assignment engine 120 and/or 124 can generate bitmaps/tables and determine, based on an analysis of the bitmaps/tables, which of the plurality of processing resources 112 is eligible and/or qualified to receive the work item and further determine which of the plurality of processing resources 112 is best suited to handle the processing needs of the work item. In situations of work item surplus, the work assignment engine 120 and/or 124 can also make the opposite determination (i.e., determine optimal assignment of a work item to a resource).

In some embodiments, the work assignment mechanism 116 may further include a context engine 128 and a resource monitoring engine 132. The context engine 128 may be configured to gather contextual information from within or outside the contact center. The context engine 128 may further assimilate the gathered contextual information, process it as necessary, and provide the processed contextual information to one or both of the work assignment engines 120. In some embodiments, the context engine 128 may be configured to gather contextual information from information sources such as websites (e.g., by sending http GET requests to web servers), enterprise servers (e.g., by analyzing email communications, document activities, meetings, agendas, etc.), social networks (e.g., by monitoring posts on a social network or of a particular social network user), RSS feeds (e.g., by subscribing to RSS feeds), real-time news sources, weather informational sources, traffic informational sources, emergency service providers (e.g., by monitoring 9-1-1 call center activity), and so on.

The resource monitoring engine 132 may be configured to analyze the activity of the contact center and determine one or more metrics that can be used to describe a current state of the contact center. In some embodiments, the resource monitoring engine 132 may be configured to analyze the speed with which inbound contacts having a certain attribute (e.g., skill requirement) are being assigned to resources 112. In some embodiments, the resource monitoring engine 132 may be configured to determine a WAT for one or more skills within the contact center. The resource monitoring engine 132 may also be adapted to analyze other aspects of contact center performance such as Estimated Wait Time (EST), Key Performance Indicators (KPIs) (e.g., First Call Resolution, $/contact, $/min, Profit/contact, Profit/min, Average Handle Time, Abandon Rate, agent preference, closure rate, quality score, commit to pay rate, revenue/target, and/or customer satisfaction), hit rate for outbound contact attempts, and the like. As will be discussed in further detail herein, the information obtained by the context engine 128 and/or resource monitoring engine 132 may be used by the outbound work assignment engine 124 to intelligently control the pacing algorithm of the outbound dialer (e.g., by controlling the rate at which outbound calls are placed and/or the types of outbound calls that are placed).

The work assignment engine(s) 120, 124 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

Figure 2:
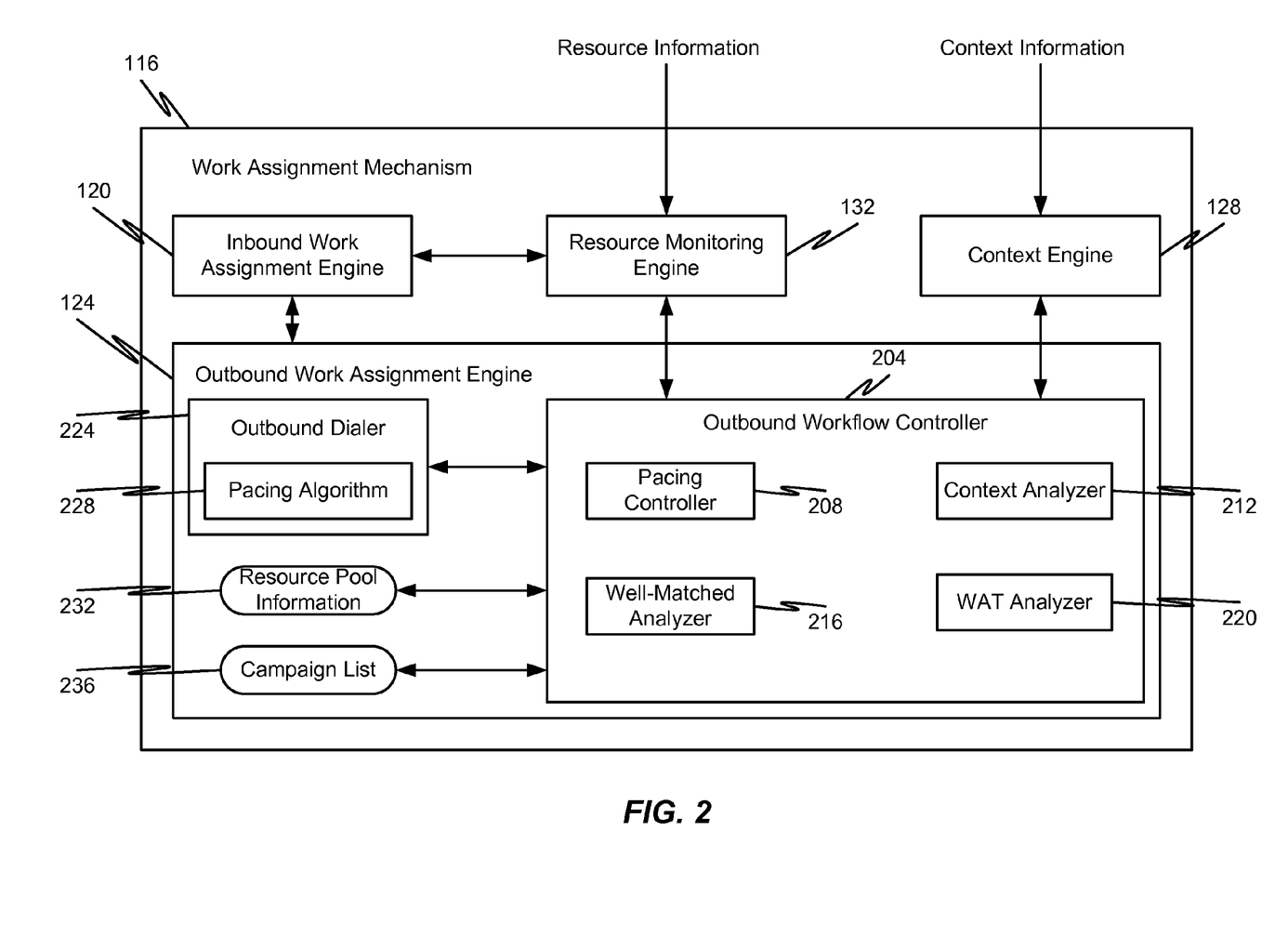
FIG. 2 is a block diagram depicting details of a work assignment mechanism in accordance with embodiments of the present disclosure.

With reference now to FIG. 2, additional details of the work assignment mechanism 116 will be described in accordance with embodiments of the present disclosure. Specifically, the outbound work assignment engine 124 may comprise an outbound dialer 224 that has a pacing algorithm 228 contained therein. The pacing algorithm 228 may be an operating parameter of the outbound dialer or it may be a function that is called or otherwise made available to the outbound dialer 224.

The outbound dialer 224, and specifically the pacing algorithm 228, may be controlled by an outbound workflow controller 204. The outbound workflow controller 204 may comprise one or more components that enable the outbound workflow controller 204 to analyze various types of information and based on such an analysis determine whether and to what extent the pacing algorithm 228 should be adjusted.

In some embodiments, the outbound workflow controller 204 comprises a pacing controller 208, a context analyzer 212, a well-matched analyzer 216, and a WAT analyzer 220. The outbound workflow controller 204 may also be referred to as a predictive tool for controlling the pacing algorithm 228 based on contextual information, well-matched information, and/or WAT information. In addition to receiving information from the resource monitoring engine 132 and context engine 128, the outbound workflow controller 204 may also have access to resource pool information 232 and a campaign list 236. These data sources may be built by and maintained within the outbound work assignment engine 124 or they may be built by other components in the contact center and made accessible to the outbound work assignment engine 124 as requested.

The context analyzer 212 may be the component of the outbound workflow controller 204 that receives context information from the context engine 128 and analyzes such information to determine whether adjustments can be made to the pacing algorithm 228 to help the contact center be more efficient in its outbound dialing campaign. In some embodiments, the context analyzer 212 may also obtain context information from the resource pool information 232. In some embodiments, the context analyzer 212 comprises the ability to monitor the success of outbound calls (or other types of outbound contact attempts), determine if there is any common characteristic or set of characteristics among the recently-successful outbound calls, and if such a common characteristic or set of characteristics exists, provide such information to the pacing controller 208. Characteristics of an outbound call that may be considered by the context analyzer 212 include, without limitation, geographical location of the customer, time of day, day of week, current weather around the geographical location of the customer, current world-wide events, current local events associated with the geographical location, product recall information, customer complaints, customer satisfaction, other information obtained from a customer database, and combinations thereof.

The well-matched analyzer 216 may be the component of the outbound workflow controller 204 that analyzes potential outbound calls in the campaign list 236, compares the skill requirements of the potential outbound calls with skills of resources 112 that are currently available or predicted to become available within a predetermined amount of time, and, based on that comparison, determines whether adjustments can be made to the pacing algorithm 228 to help the contact center be more efficient in its outbound dialing campaign. As can be appreciated, the information concerning the resources 112 may be acquired from the resource monitoring engine 132. The analytical results obtained by the well-matched analyzer 216 may be provided to the pacing controller 208, which implements the adjustments to the pacing algorithm 228, if necessary.

The WAT analyzer 220 may be the component of the outbound workflow controller 204 that determines a WAT for a skill (or equivalent grouping of work items), and, based on that determination, determine whether adjustments can be made to the pacing algorithm 228 to help the contact center be more efficient in its outbound dialing campaign. The information needed to calculate the WAT (or similar metric such as EWT, Actual Wait Time, etc.) may be obtained from the resource monitoring engine 132, the resource pool information 232, or some other analytical tool in the work assignment mechanism 116 that is capable of monitoring the efficiency with which the contact center processes work items. The analytical results obtained by the WAT analyzer 220 may be provided to the pacing controller 208, which implements the adjustments to the pacing algorithm 228, if necessary.

As noted above, the pacing controller 208 may receive multiple inputs from multiple analyzers 212, 216, 220. In some situations one analyzer may provide the pacing controller 208 with instructions to adjust the pacing algorithm 228 in one way (e.g., speed up the rate at which outbound calls are dialed) whereas another analyzer may provide the pacing controller 208 with instructions to adjust the pacing algorithm 228 in a different way (e.g., slow down the rate at which outbound calls are dialed). The pacing controller 208 may be provided with an arbitration function that enables the pacing controller 208 to manage conflicting instructions from different analyzers. The arbitration function may simply comprise a rule or set of rules that define what action should be taken under various circumstances. The rule(s) may be as simple as obey instructions from one analyzer over instructions from another analyzer. Alternatively, the rule(s) may be complex equations or optimization functions that weigh (equally or unequally) the various inputs from the analyzers and determines whether and to what extent the pacing algorithm 228 should be adjusted.

The campaign list 236 may comprise an ordered list of numbers that are to be dialed by the outbound dialer 224 according to the order in which they are listed (e.g., first number is to-be dialed first, second number is to-be dialed second, etc.). Alternatively, the campaign list 236 may comprise an unordered pool of work items. In some embodiments, the pacing controller 208 may also be configured to re-order the campaign list 236, especially if instructed to do so by the well-matched analyzer. Alternatively, or in addition, the pacing controller 208 may instruct the pacing algorithm 228 to re-order the campaign list 236 or select certain numbers from the campaign list 236 so as to maximize the efficiency of the contact center. As a non-limiting example, the well-matched analyzer 216 may determine that an agent or multiple agents are currently available to handle outbound calls of a certain type with a certain degree of efficiency (e.g., based on one or more skills or attributes of the agent(s)). The well-matched analyzer 216 may instruct the pacing controller 208 that a well-matched condition exists and that the pacing algorithm 228 should be adjusted to capitalize on the well-matched condition. Accordingly, the pacing controller 208 may instruct the pacing algorithm 228 to select certain numbers from the campaign list 236 that have skill requirements or known attributes that match the skills or attributes of the available or soon-to-be-available agents.

Figure 3:
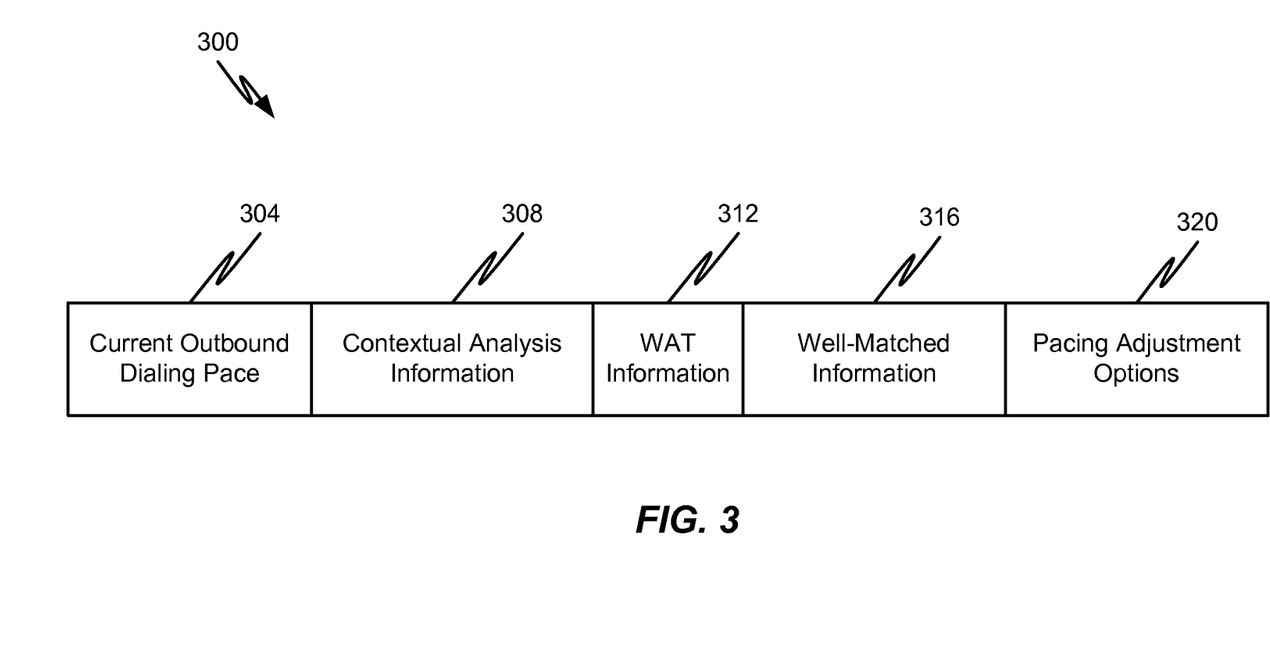
FIG. 3 is a block diagram depicting a data structure used in accordance with embodiments of the present disclosure.

FIG. 3 depicts one example of a data structure 300 which may be generated and used by the various components of the work assignment mechanism 116. In particular, a contact center may use the data structure 300 or multiple similar data structures to help determine how and when the pacing algorithm 228 of the outbound dialer 224 should be adjusted. In particular, the pacing controller 208 may maintain or at least employ parts of the data structure 300.

The information fields that may be contained in the data structure 300 include, for example, a current outbound dialing pace field 304, a contextual analysis information field 308 a WAT information field 312, a well-matched information field 316, and a pacing adjustment options field 320.

The current outbound dialing pace 304 may comprise information describing the rate at which the outbound dialer 224 is current dialing outbound calls. The dialing pace may be described in total outbound call attempts per minute (or any other measure of time). Alternatively, or in addition, the dialing pace may be described on a per-skill basis. Thus, each type of outbound contact may have its own dedicated data structure 300 or at least a different row (or column) within a common data structure.

The contextual analysis information field 308 may comprise results of the analysis carried out by the context analyzer 212. Specifically, this information field may comprise the data that was analyzed by the context analyzer 212 (e.g., data obtained from the context engine 128) and/or results of the analysis of the contextual information. Further still, the contextual analysis information field 308 may comprise instructions for the pacing controller 208 to adjust the pacing algorithm 228 if such a decision could be based solely on the analysis of contextual information.

The WAT information field 312 may comprise results of the analysis carried out by the WAT analyzer 220. Specifically, this information field may comprise the current WAT for certain skills or for multiple skills. Alternatively, or in addition, a WAT for every inbound contact in the contact center may be calculated and maintained in the WAT information field 312. Further still, this data field may comprise instructions for the pacing controller 208 to adjust the pacing algorithm 228 if such a decision could be based solely on the analysis of the WAT information.

The well-matched information field 316 may comprise results of the analysis carried out by the well-matched analyzer 216. Specifically, this information field may comprise skill or attribute information for every potential work item in the campaign list 236, if such information is known. Additionally, the well-matched information field 316 may comprise skill or attribute information for every agent in the contact center, for currently available agents, for agents predicted to soon be available, or combinations thereof. This information field may further comprise information regarding the comparison of skill or attribute information for agents with skill or attribute information for potential work items in the campaign list 236. As with the other data fields, this data field may comprise instructions for the pacing controller 208 to adjust the pacing algorithm 228 if such a decision could be based solely on the analysis of the WAT information.

The pacing adjustment options field 320 may comprise any arbitration function or similar decision-making criteria that can be used by the pacing controller 208 to determine whether and to what extent the pacing algorithm 228 should be adjusted. The information in the pacing adjustment options field 320 may be based on the data in the other fields. For instance, the adjustment options may include variables that are linked to data in the other fields of the data structure 300.

Figure 4:
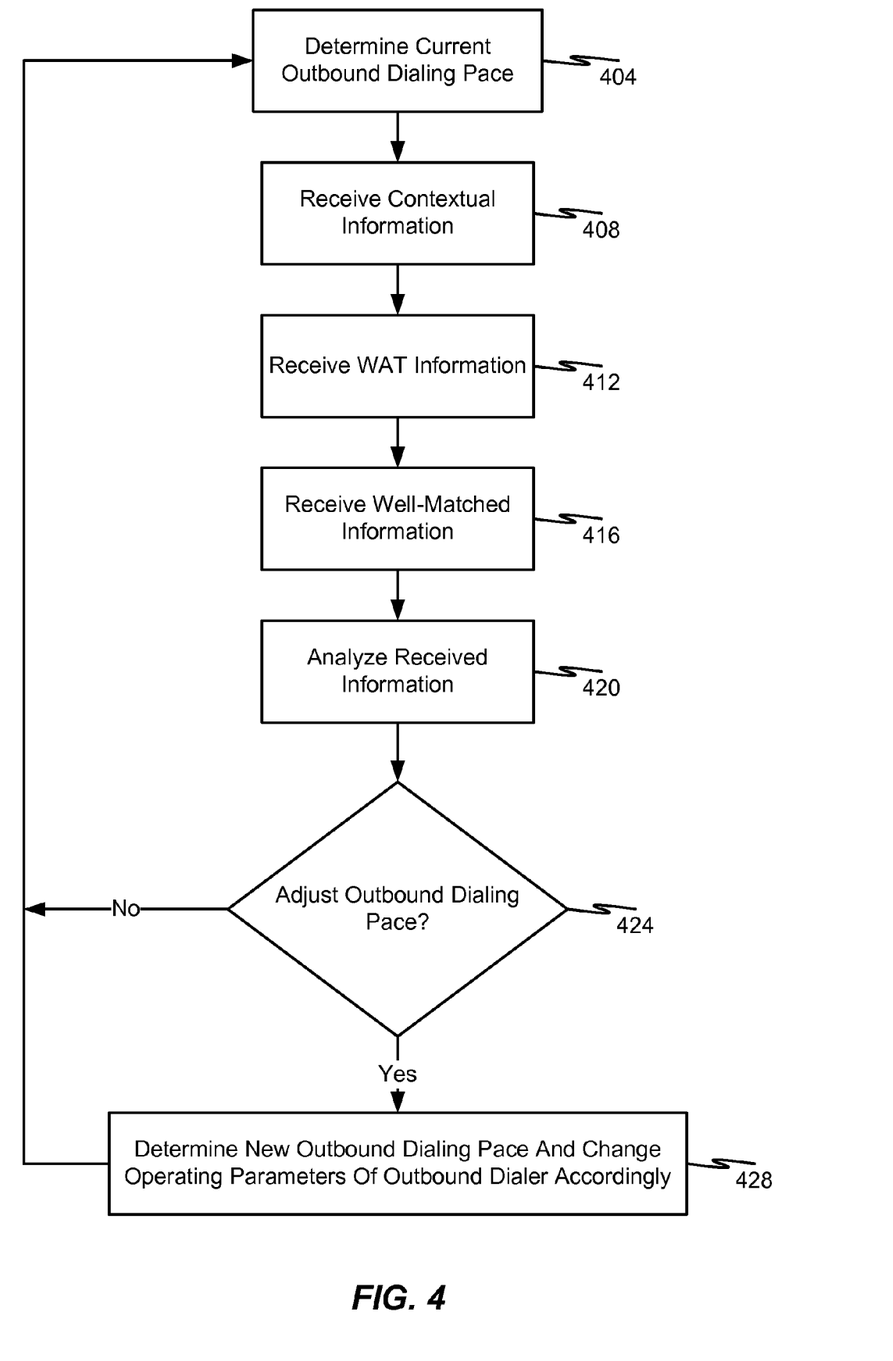
FIG. 4 is a flow diagram depicting a method of controlling an outbound dialer in a contact center in accordance with embodiments of the present disclosure.

With reference now to FIG. 4, a method of controlling and dynamically adjusting the outbound dialer's pacing algorithm 228 will be described in accordance with embodiments of the present disclosure. The method begins with the pacing controller 208 determining the current outbound dialing pace and any other information necessary to qualify how the pacing algorithm 228 is currently behaving (step 404). This information may be obtained directly from the outbound dialer 224 or it may be inferred by analyzing the campaign list 236 and changes made thereto.

The method continues with the outbound workflow controller 204 receiving contextual information (step 408), WAT information (step 412), and/or well-matched information (step 416). This information may be received as raw data, as changes made relative to a last measurement of such data, or in any other format that can be analyzed by the various analyzers 208, 212, 216 of the outbound workflow controller 204.

The information received at the outbound workflow controller 204 is then analyzed by the appropriate analyzer (step 420). Results of each informational analysis may be provided to the pacing controller 208 where the analyses are combined and further analyzed, as a whole, by the pacing controller 208.

Based on the analyses made by the analyzers 212, 216, 220 and/or the further analysis thereof made by the pacing controller 208, the method continues with the pacing controller 208 determining whether and to what extent the outbound dialer's pacing algorithm 228 should be adjusted (step 424). As noted above, this decision may include an arbitration step where the inputs from the various analyzers 212, 216, 220 are weighed. If the decision is made not to adjust the pacing algorithm 228, then the method returns to step 404.

Alternatively, the method will continue with the pacing controller 208 generating and providing instructions to the outbound dialer 224 that cause the outbound dialer 224 to adjust the pacing algorithm 228 in one way or another (step 428). In some embodiments, the adjustment of the pacing algorithm may include altering an operating parameter of the pacing algorithm 228 to increase or decrease the rate with which the outbound dialer 224 attempts outbound contacts. Alternatively, or in addition, the adjustment of the pacing algorithm may include re-ordering the campaign list 236 or instructing the outbound dialer 224 to dial certain contacts or certain types of contacts before dialing other contacts.

After the pacing algorithm 228 has been adjusted by the pacing algorithm 208, the method returns to step 404.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of controlling an outbound dialer in a contact center, the method comprising:
   determining, by a processor, a current outbound dialing pace that is implemented by an outbound dialer;
   analyzing, by the processor at a first time, a plurality of skills in the contact center to determine a Weighted Advance Time (WAT) for the plurality of skills in the contact center and at least one of (a) a hit rate of successful outbound contacts that have occurred within a predetermined amount of time prior to the first time and (b) a well-matched criteria between a subset of agents in the contact center and potential outbound calls in an outbound dialing campaign list;
   based on the analysis, adjusting, by the processor, the current outbound dialing pace to yield an adjusted outbound dialing pace that is faster or slower than the current outbound dialing pace selected to cause the WAT for one of the plurality of skills to be adjusted to more closely match the at least one of (a) the hit rate of successful outbound contacts that have occurred within a predetermined amount of time prior to the first time and (b) the well-matched criteria between the subset of agents in the contact center and potential outbound calls in the outbound dialing campaign list; and adjusting, by the processor, an operating parameter of a pacing algorithm controlling the pace of the outbound dialer to implement the adjusted outbound dialing pace instead of the current outbound dialing pace.

2. The method of claim 1, wherein the processor, at the first time, analyzes a plurality of characteristics comprising: (a) the hit rate of successful outbound contacts that have occurred within a predetermined amount of time prior to the first time, (b) the well-matched criteria between the subset of agents in the contact center and potential outbound calls in an outbound dialing campaign list, and (c) the WAT for the one of the plurality skills in the contact center and wherein the processor adjusts the operating parameter of the outbound dialer's pacing algorithm based on the analysis of the plurality of the characteristics.

3. The method of claim 2, further comprising:

determining, by the processor, that an adjustment of the operating parameter of the outbound dialer's pacing algorithm based on the analysis of one of (a) the hit rate of successful outbound contacts that have occurred within a predetermined amount of time prior to the first time, (b) the well-matched criteria between the subset of agents in the contact center and potential outbound calls in the outbound dialing campaign list, and (c) the WAT for at least one of the plurality of skills in the contact center contradicts an adjustment of the outbound dialer's pacing algorithm based on the analysis of a different one of (a) the hit rate of successful outbound contacts that have occurred within a predetermined amount of time prior to the first time, (b) the well-matched criteria between the subset of agents in the contact center and potential outbound calls in the outbound dialing campaign list, and (c) the WAT for at least one the plurality of skills in the contact center; and applying, by the processor, an arbitration algorithm to resolve the contradiction.

4. The method of claim 1, wherein adjusting the operating parameter of the outbound dialer's pacing algorithm comprises adjusting, by the processor, a rate at which outbound calls are made by the outbound dialer.

5. The method of claim 1, further comprising adjusting, by the processor, an order of the outbound dialing campaign list such that a first potential outbound call that was scheduled to be called before a second potential outbound call is re-scheduled to be called after the second potential outbound call, wherein the second potential outbound call is determined, by the processor, to have a better skill match with one or more agents in the subset of agents as compared to the first potential outbound call.

6. The method of claim 1, wherein the operating parameter of the outbound dialer's pacing algorithm is adjusted, by the processor, based on the well-matched criteria, wherein the subset of agents corresponds to available agents and agents predicted, by the processor, to be available within a predetermined amount of time after the first time, and wherein the following criteria are followed in connection with adjusting the operating parameter of the outbound dialer's pacing algorithm:

if one or more agents in the subset of agents have a skill that matches a skill requirement of one or more of the potential outbound calls, then increase, by the processor, a rate at which the outbound dialer's pacing algorithm dials outbound calls from the outbound dialing campaign list; and if no agents in the subset of agents have the skill that matches the skill requirement of one or more of the potential outbound calls, then decrease, by the processor, the rate at which the outbound dialer's pacing algorithm dials outbound calls from the outbound dialing campaign list.

7. The method of claim 1, wherein the operating parameter of the outbound dialer's pacing algorithm is adjusted, by the processor, based on the WAT and wherein the following criteria are followed in connection with adjusting the operating parameter of the outbound dialer's pacing algorithm:

if the WAT is above a first predetermined WAT threshold, then decrease, by the processor, a rate at which the outbound dialer's pacing algorithm dials outbound calls from the outbound dialing campaign list; and if the WAT is below a second predetermined WAT threshold that is lower than the first predetermined WAT threshold, then increase, by the processor, the rate at which the outbound dialer's pacing algorithm dials outbound calls from the outbound dialing campaign list.

8. The method of claim 1, wherein the operating parameter of the outbound dialer's pacing algorithm is adjusted, by the processor, based on the WAT and wherein the following criteria are followed in connection with adjusting the outbound dialer's pacing algorithm:

if the WAT is determined to be increasing, then decrease, by the processor, a rate at which the outbound dialer's pacing algorithm dials outbound calls from the outbound dialing campaign list; and if the WAT is determined to be decreasing, then increase, by the processor, the rate at which the outbound dialer's pacing algorithm dials outbound calls from the outbound dialing campaign list.

9. A system comprising:

an outbound dialer comprising a pacing algorithm, the pacing algorithm having an operating parameter controlling the pace for the outbound dialer; and a processor programmed to:

analyze, at a first time, a plurality of skills in the contact center to determine a Weighted Advance Time (WAT) for the plurality of skills in the contact center and at least one of (a) a hit rate of successful outbound contacts that have occurred within a predetermined amount of time prior to the first time and (b) a well-matched criteria between a subset of agents in the contact center and potential outbound calls in an outbound dialing campaign list;

determine, based on the analysis, an adjustment to the current outbound dialing pace, the adjustment yielding an adjusted outbound dialing pace that is faster or slower than the current outbound dialing pace selected to cause the WAT for one of the plurality of skills to be adjusted to more closely match the at least one of (a) the hit rate of successful outbound contacts that have occurred within a predetermined amount of time prior to the first time and (b) the well-matched criteria between the subset of agents in the contact center and potential outbound calls in the outbound dialing campaign list; and adjust the operating parameter of the pacing algorithm controlling the pace of the outbound dialer to implement the adjusted outbound dialing pace instead of the current outbound dialing pace.

10. The system of claim 9, wherein the processor analyzes a plurality of characteristics comprising: (a) the hit rate of successful outbound contacts that have occurred within a predetermined amount of time prior to the first time, (b) the well-matched criteria between the subset of agents in the contact center and potential outbound calls in the outbound dialing campaign list, or (c) the WAT for at least one of the plurality of skills in the contact center at the first time and, wherein the processor adjusts the outbound dialer's pacing algorithm based on the analysis of the plurality of the characteristics, wherein the processor determines that adjusting the operating parameter based on the processor's analysis of one of the plurality of the characteristic contradicts an adjustment of the operating parameter based on the analysis of a different one of the plurality of characteristics; and wherein the processor executes an arbitration algorithm to resolve the contradiction.

11. The system of claim 9, wherein the processor adjusts the outbound dialer's pacing algorithm by changing a rate at which outbound calls are made by the outbound dialer.

12. The system of claim 9, wherein the processor adjusts the operating parameter of the pacing algorithm by changing an order of the outbound dialing campaign list such that a first potential outbound call that was scheduled to be called before a second potential outbound call is re-scheduled to be called after the second potential outbound call, and wherein the processor determines that the second potential outbound call has a better skill match with one or more agents in the subset of agents as compared to the first potential outbound call.

13. The system of claim 9, wherein the processor adjusts the operating parameter of the pacing algorithm based on the well-matched criteria, wherein the subset of agents correspond to available agents and agents predicted to be available within a predetermined amount of time after the first time, and wherein the processor is programmed to follow the following rules in connection with adjusting the outbound dialer's pacing algorithm:

if one or more agents in the subset of agents have a skill that matches a skill requirement of one or more of the potential outbound calls, then increase a rate at which the outbound dialer's pacing algorithm dials outbound calls from the outbound dialing campaign list; and if no agents in the subset of agents have the skill that matches the skill requirement of one or more of the potential outbound calls, then decrease the rate at which the outbound dialer's pacing algorithm dials outbound calls from the outbound dialing campaign list.

14. The system of claim 9, wherein the processor adjusts the operating parameter of the outbound dialer's pacing algorithm based on the WAT and wherein the processor is programmed to follow the following rules in connection with adjusting the outbound dialer's pacing algorithm:

if the WAT is above a first predetermined WAT threshold, then decrease a rate at which the outbound dialer's pacing algorithm dials outbound calls from the outbound dialing campaign list; and if the WAT is below a second predetermined WAT threshold that is lower than the first predetermined WAT threshold, then increase the rate at which the outbound dialer's pacing algorithm dials outbound calls from the outbound dialing campaign list.

15. The system of claim 9, wherein the processor adjusts the operating parameter of the pacing algorithm based on the WAT and wherein the processor is programmed to follow the following rules in connection with adjusting the outbound dialer's pacing algorithm:

if the WAT is determined to be increasing, then decrease a rate at which the outbound dialer's pacing algorithm dials outbound calls from the outbound dialing campaign list; and if the WAT is determined to be decreasing, then increase the rate at which the outbound dialer's pacing algorithm dials outbound calls from the outbound dialing campaign list.

16. A contact center, comprising:
an outbound work assignment engine including:
at least one processor;
an outbound dialer that dials calls from a campaign list according to rules contained in a pacing algorithm of the outbound dialer;
wherein the at least one processor:
determines a current outbound dialing pace that is implemented by an outbound dialer;
analyzes, at a first time, a plurality of skills in the contact center to determine a Weighted Advance Time (WAT) for the plurality of skills in the contact center and, at least one of (a) a hit rate of successful outbound contacts that have occurred within a predetermined amount of time prior to the first time and (b) a well-matched criteria between a subset of agents in the contact center and potential outbound calls in an outbound dialing campaign list; and
determines that the current outbound dialing pace requires an adjustment to yield an adjusted outbound dialing pace that is faster or slower than the current outbound dialing pace in accord with the analysis to cause the WAT for one of the plurality of skills to be adjusted to more closely match the at least one of (a) the hit rate of successful outbound contacts that have occurred within a predetermined amount of time prior to the first time and (b) the well-matched criteria between the subset of agents in the contact center and potential outbound calls in the outbound dialing campaign list;
wherein a pacing controller adjusts an operating parameter of the outbound dialer's pacing algorithm to implement the adjusted outbound dialing pace instead of the current outbound dialing pace.

17. The contact center of claim 16, wherein a plurality of the characteristics comprising: (a) the hit rate of the successful outbound contacts that have occurred within a predetermined amount of time prior to the first time, (b) the well-matched criteria between the subset of agents in the contact center and potential outbound calls in the outbound dialing campaign list, or (c) the WAT for at least one of the plurality of skills in the contact center are analyzed by the at least one processor at the first time;

wherein the operating parameter of the outbound dialer's pacing algorithm is adjusted, by the at least one processor, based on the analysis of the plurality of the characteristic;

wherein the pacing controller determines that an adjustment of the operating parameter of the outbound dialer's pacing algorithm based on the analysis of one of the plurality of the characteristic contradicts an adjustment of the operating parameter of the outbound dialer's pacing algorithm based on the analysis of a different one of the plurality of the characteristics; and in response to the at least one processor making the determination, the at least one processor applies an arbitration algorithm to resolve the contradiction.

18. The contact center of claim 16, wherein at least one processor adjusts the outbound dialer's pacing algorithm by changing a rate at which outbound calls are made by the outbound dialer.

19. The contact center of claim 16, further comprising the at least one processor, changing the outbound dialer's pacing algorithm to an order of the outbound dialing campaign list such that a first potential outbound call that was scheduled to be called before a second potential outbound call is re-scheduled to be called after the second potential outbound call.

20. The contact center of claim 19, wherein the at least one processor determines that the second potential outbound call has a better skill match with one or more agents in the subset of agents as compared to the first potential outbound call.

* * * * *